Oct. 11, 1938.     J. W. MacCLATCHIE     2,132,794
INTERNAL COMBUSTION ENGINE
Original Filed Aug. 19, 1933    2 Sheets-Sheet 1
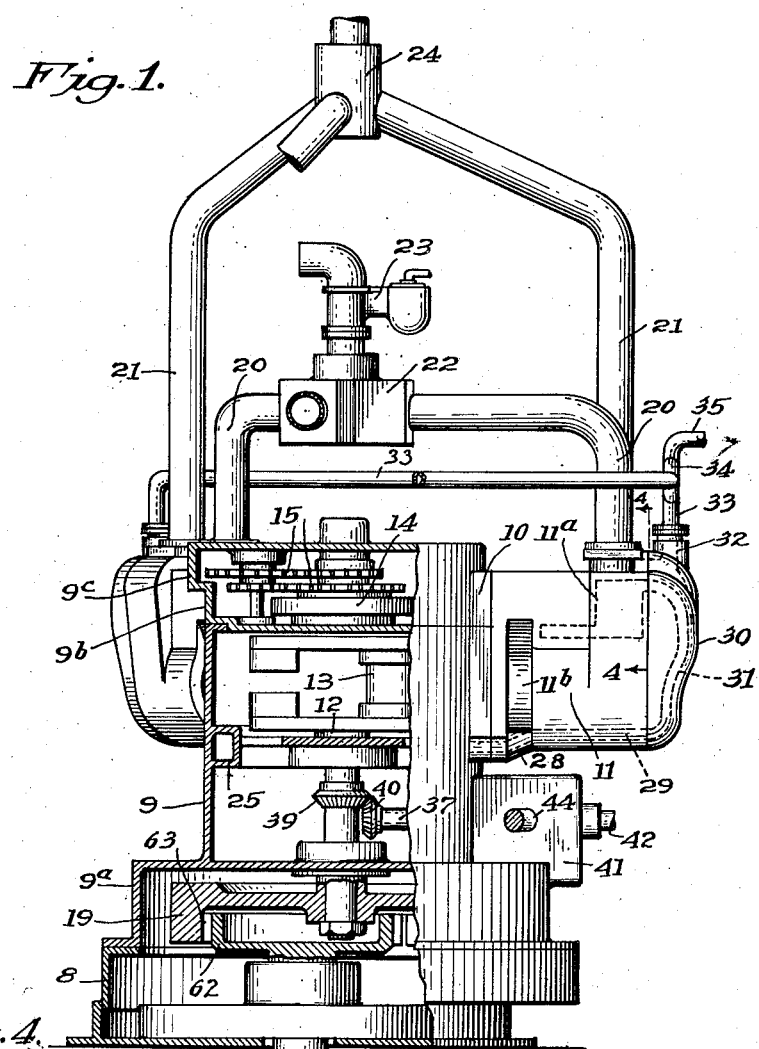
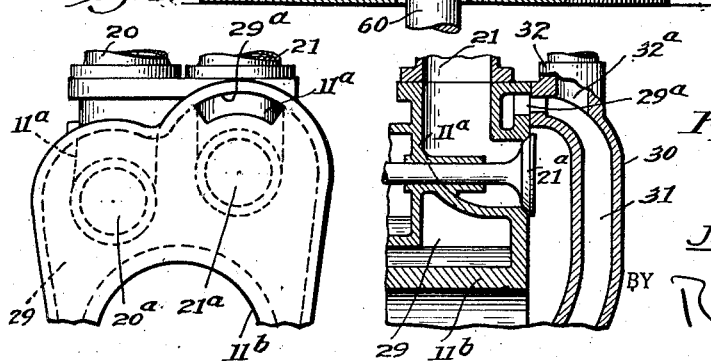
INVENTOR.
John W. MacClatchie
BY
ATTORNEY.

Oct. 11, 1938.   J. W. MacCLATCHIE   2,132,794
INTERNAL COMBUSTION ENGINE
Original Filed Aug. 19, 1933   2 Sheets-Sheet 2

INVENTOR.
John W. MacClatchie
BY
ATTORNEY.

Patented Oct. 11, 1938

2,132,794

UNITED STATES PATENT OFFICE 2,132,794

INTERNAL COMBUSTION ENGINE

John W. MacClatchie, Los Angeles, Calif.

Original application August 19, 1933, Serial No. 685,931. Divided and this application September 7, 1935, Serial No. 39,565

5 Claims. (Cl. 123—173)

This invention is an internal combustion engine, the present application being a division of my copending application Ser. No. 685,931 filed August 19, 1933 which patent application matured into Patent Number 2,074,702, March 23, 1937.

It is an object of the invention to provide a vertical crank shaft and horizontal cylinders for an internal combustion engine, with the various parts so arranged as to insure a compact assembly and permit free access to the engine and at the same time protect the various accessories of the engine against liability of damage.

It is a further object of the invention to circulate a cooling medium around the cylinders of an engine so that the exhaust valves, where there is the greatest danger of overheating, are efficiently cooled.

It is a still further object of the invention to circulate a cooling medium around the cylinders and thence around the exhaust valves, whereby the cooling medium as it flows past the cylinders is at lower temperature than that to which it is subsequently raised as it flows past the exhaust valves, and after being heated by flowing past the exhaust valves is then discharged from the water jackets of the cylinders and recooled before being used further as a cooling medium.

It is a still further object of the invention to provide thermo-syphon circulation for horizontal cylinders, with the cooling medium uniformly distributed to the various cylinders and the flow past each cylinder being separately discharged and recooled before reuse.

Further objects of the invention will be readily understood from the following description of the accompanying drawings, in which:

Fig. 1 is a front elevation of an engine constructed in accordance with the invention, partly in axial section.

Fig. 4 is a plan view of the end of one cylinder with the head removed along the line 4—4 of Fig. 1, the valves being shown in dotted outline.

Fig. 5 is a detail section on the line 5—5 of Fig. 2.

Figure 2:
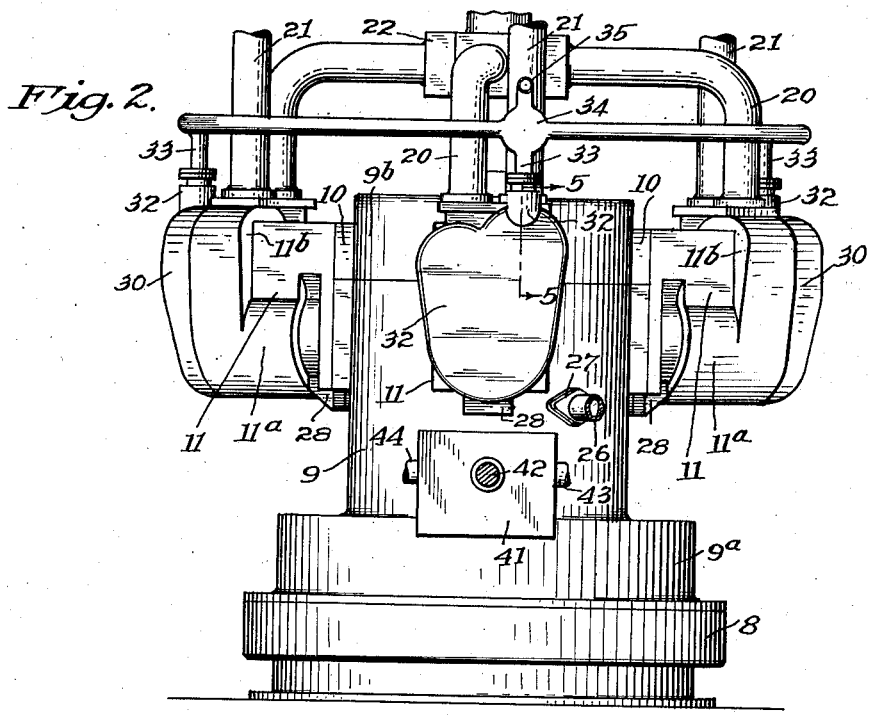
Fig. 2 is a side elevation of the engine.
Figure 3:
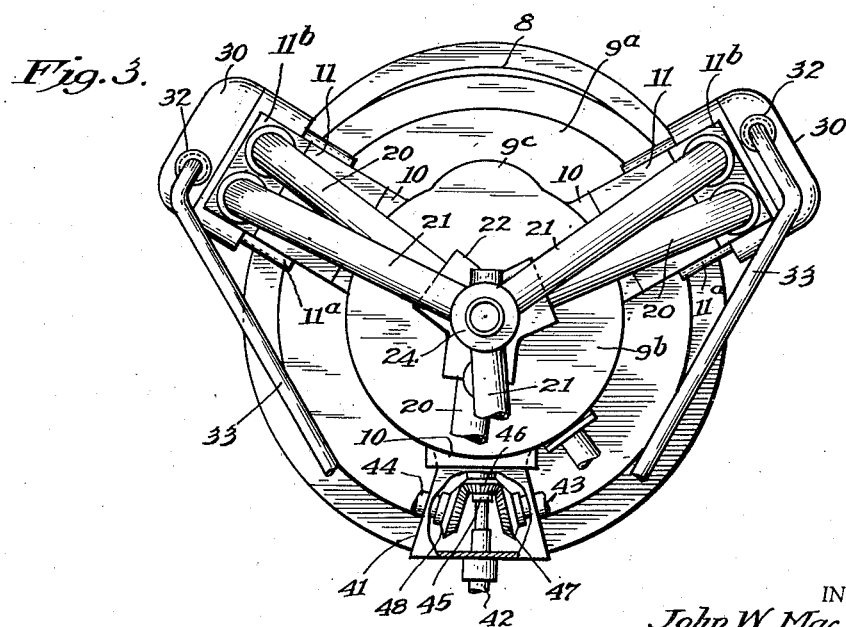
Fig. 3 is a plan view of the engine.

The engine is shown as a radial cylinder internal combustion engine having its crank shaft vertically disposed, the crank case 9 of the engine preferably resting upon a casing extension 8 which may be mounted on any suitable support. The crank case 9 is shown cylindrical on a vertical axis, and its lower end may be enlarged for reception of a flywheel as shown at 9a, and its upper end preferably includes an extension 9b having a radial enlargement 9c and adapted to house the cam mechanism for the valves of the engine. The periphery of the crank case has a plurality of flanged openings 10 for radial cylinder blocks 11, and a crank shaft 12 is journaled in the crank case on a vertical axis. Piston rods for the cylinders 11b of the respective cylinder blocks are connected to a common crank-throw 13 of the crank shaft. The upper portions of the cylinder blocks form valve casings 11a for usual intake and exhaust valves, and the valves are operated by cam mechanism 14 which is shown journaled on shaft 12, and which may be driven by shaft 12 through gearing 15 which is housed in the casing extension 9b. A flywheel 19 is preferably fixed on the lower end of shaft 12 and is housed in casing 9a.

Intake and exhaust pipes 20 and 21 communicate with the intake and exhaust valves for the respective cylinders; and the intake pipes 20 project upwardly from the respective cylinder blocks and then extend toward the vertical axis of the engine where they are connected to a manifold 22 which is supplied with fuel from a carbureter 23, and the exhaust pipes 21 project upwardly from the respective cylinder blocks and then extend toward the vertical axis of the engine in spaced relation above the carbureter 23 and are connected to an exhaust manifold 24. It will thus be seen that free access may be had to the engine from all sides without obstruction by the intake and exhaust pipes, and that the carbureter is protected by being within the spider-like structure which is formed by the exhaust pipes 21, and that the exhaust manifold 24 discharges into the atmosphere at a relatively high level so that the exhaust gases clear the operator when he is working around the engine.

The engine is water-cooled, water being supplied to an annular duct 25 in the crank case 9 via a supply pipe 26 connected to a water inlet 27, and the water flows from the annular duct through connections 28 to the lower sides of water jackets 29 of the respective cylinder blocks, it being noted that the duct 25 is horizontally disposed and that the connections 28 for the respective cylinder blocks are all in the same horizontal plane so that water supplied to the duct 25 will be equally distributed to the water jackets of the respective cylinder blocks.

Heads 30 are mounted on the cylinder blocks and have extensions 31 of the water jackets 29, provided with outlets 32 at the upper sides of the valve casings 11a of the respective cylinder blocks, with these outlets laterally offset from the vertical axial planes of the cylinder blocks as shown at Fig. 2 so that they communicate with the water jackets at points adjacent the exhaust valves. Consequently there is thermo-syphon circulation through the water jackets, from the connections 28 at the lower sides of the cylinder blocks, thence around the cylinders 11b, and thence around the intake and exhaust valves, with the water discharging at outlets 32 just after it has circulated around the exhaust valves. The water will have been raised to its maximum temperature by passing the hot spots at the exhaust valves, so that the water initially flows around the cylinders 11b at a temperature lower than this maximum and is then discharged immediately after reaching its maximum temperature. Efficient cooling is thus assured.

The outlets 32 for the water jackets may be connected by pipes 33 leading from the respective outlets 32 to a manifold 34 having an outlet 35; and in addition to the thermo-syphon circulation through the water jackets of the respective cylinder blocks, the entire body of water may be circulated by a suitable pump not shown, the water flowing from outlet 35 to a suitable radiator or other cooling means (not shown) and the cooled water then being returned to the engine via pipe 26. A drive shaft 37 for the pump of the circulation system may project radially from the crank case 9, with bevel gears 39—40 forming a driving connection between the crank shaft 12 and the inner end of the shaft 37. The outer end of the shaft 37 is preferably also adapted to drive a generator and distributor for the ignition system of the engine, and to drive a pump which forces lubricating oil to the bearings of the engine.

As an instance of this arrangement a gear casing 41 which projects radially from crank case 9 may enclose the outer end of shaft 37; and a shaft 42 for the pump of the water circulating system may project radially beyond the gear casing, and shafts 43—44 may project from the respective sides of the gear casing. The shaft 37 may drive the shaft 42 through a coupling 45, and may drive the shafts 43—44 through a bevel gear 46 which is fixed on shaft 37 and which meshes with bevel gears 47—48 on shafts 43—44 respectively. The shaft 43 may drive an oil pump (not shown) which forces oil to the various bearings of the engine; and the shaft 44 may drive a generator and a distributor for the ignition system (which elements are not shown).

The casing 8 and the flywheel casing 9a preferably house a driving connection between the crank shaft 12 and a drive shaft 60, and this driving connection preferably includes gearing. As an instance of this arrangement the shaft 60 is journaled in casing 8 so that the shafts 12—60 are laterally offset in order that an external gear 62 which is fixed on the shaft 60 may mesh with an internal gear 63 on the flywheel 19.

The invention as thus described provides a compact engine having a vertically disposed drive shaft and horizontal radial cylinders, and insures adequate cooling of the cylinders and their valves, with the cooling medium flowing upwardly around the cylinders and thence around the valves for discharge just after it has reached its maximum temperature after passing the exhaust valves.

At Figs. 4 and 5 I have shown in more detail this previously described arrangement of the valves with relation to the water jackets. The intake and exhaust valves of a cylinder are shown respectively at 20a and 21a, and the extension 31 of the water jacket 29 is shown communicating with the main water jacket at 29a. The outlets 32 are shown communicating with the extension 31 of the water jacket via port 32a which open into the water space at its highest level, above and adjacent the exhaust valve 21a. The water thus flows around the cylinder 11b and thence around the valves, with no possibility of the water being trapped and held against flow at any point in its circulation, and with the water flowing upwardly around the cylinder and thence around the valves and discharging at the outlet 32 immediately after it has passed around the exhaust valve 21a.

I claim:

1. A cooling system for an internal combustion engine having an annular bank of radially disposed cylinders, said system embodying a cooling liquid jacket for each cylinder, an annular cooling liquid supply chamber at one side of said bank of cylinders, said annular supply chamber being substantially concentric with said cylinder bank but of smaller diameter than the outside diameter of the said bank, each cylinder jacket having a cooling liquid inlet thereto at the side thereof adjacent said annular supply chamber, a separate supply connection from said annular chamber to said jacket inlets respectively, the jackets being closed against liquid supply thereto except through their separate inlets, each cylinder jacket having an outlet therefrom at the opposite side of the cylinder from the liquid inlet, an outlet liquid manifold at the same side of said cylinder bank as said jacket outlets, and an outlet liquid connection from each cylinder jacket outlet to said outlet manifold.

2. A cooling system for an internal combustion engine having an annular bank of radially disposed cylinders positioned in a horizontal plane, said system embodying a cooling liquid jacket for each cylinder, a horizontally disposed water supply chamber below said cylinder bank but within the projected area of the lower side of said bank, each cylinder jacket having a cooling liquid inlet thereto in the lower portion thereof, a separate cooling liquid supply connection from said horizontal supply chamber to said jacket inlets respectively, the cylinder jackets being closed against liquid supply thereto except through their separate inlets and said supply connections all communicating with the supply chamber at the same level, each cylinder jacket having a cooling liquid outlet therefrom at the upper side thereof adjacent the outer end of the cylinder, an outlet water manifold at the upper side of and substantially within the projected area of the upper side of said cylinder bank and an outlet water connection from each cylinder jacket outlet to said outlet liquid manifold.

3. A cooling system for an internal combustion engine having an annular bank of radially disposed cylinders, said system embodying a cooling liquid jacket for each cylinder, a cooling liquid supply duct at one side of and extending around said cylinder bank adjacent the inner ends of said cylinder jackets, each cylinder jacket having a cooling liquid inlet thereto adjacent said supply duct, a separate liquid connection from said supply duct to said jacket inlets, respectively, the cooling liquid jackets being closed against liquid supply thereto except through their separate inlets, each cylinder jacket having a cooling liquid outlet therefrom at the opposite side of the cylinder bank from said jacket inlets but adjacent the outer end of each jacket, an outlet liquid manifold at the same side of said cylinder bank as said cylinder jacket outlets, said manifold being substantially disposed within the projected area of said cylinder bank, and outlet liquid connections from the cylinder jacket outlets to said outlet liquid manifold, said outlet water connections also being within the projected area of the cylinder bank.

4. In a cooling system for an internal combustion engine having an annular bank of radially disposed cylinders, said system embodying the combination with said cylinder bank of, a cooling liquid jacket for each cylinder, a cooling liquid supply duct at one side of and extending around said cylinder bank adjacent the inner ends of said cylinders, each cylinder jacket having a cooling liquid inlet thereto adjacent said supply duct, a separate cooling liquid supply connection from said supply duct to said jacket inlets, respectively, the cylinder jackets being closed against liquid supply thereto, except through their separate inlets, each cylinder jacket having a liquid outlet therefrom at the opposite side of the cylinder bank from the jacket inlets and said outlet being adjacent the outer end of the cylinder jacket, an outlet liquid line extending around and adjacent the outer ends of the cylinders at the side of said cylinder bank at which said jacket outlets are located, a liquid connection between each jacket outlet and said outlet liquid line, and an outlet liquid manifold connnected with said outlet line, the outlet liquid line, jacket outlet connections and said outlet liquid manifold being located within the projected area of the adjacent side of said cylinder bank.

5. A cooling system for an internal combustion engine having an annular bank of radially disposed cylinders positioned in a horizontal plane, said system embodying a cooling liquid jacket for each cylinder, an annular cooling liquid supply passage at the lower side of said cylinder bank disposed adjacent the inner ends of the cylinders, each cylinder jacket having a cooling liquid inlet thereto, a separate liquid supply connection from said annular supply passage to said jacket inlets, respectively, the cylinder jackets being closed against supply thereto except through their separate inlets, each cylinder jacket having an outlet therefrom at the upper side of the cylinder bank and adjacent the outer end of the jacket, an outlet liquid manifold at the upper side of said cylinder bank, an outlet liquid connection from each cylinder jacket outlet to said manifold, and said outlet liquid manifold and outlet liquid connections thereto being disposed substantially within the upwardly projected area of the upper side of said cylinder bank.

JOHN W. MacCLATCHIE.